(12) United States Patent
Ott

(10) Patent No.: US 8,592,724 B2
(45) Date of Patent: *Nov. 26, 2013

(54) REMOTE WIRE FEEDER USING BINARY PHASE SHIFT KEYING TO MODULATE COMMUNICATIONS OF COMMAND/CONTROL SIGNALS TO BE TRANSMITTED OVER A WELD CABLE

(75) Inventor: Brian L. Ott, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2246 days.

This patent is subject to a terminal disclaimer.

(21) Appl. No.: 11/276,288

(22) Filed: Feb. 22, 2006

(65) Prior Publication Data

US 2006/0138113 A1    Jun. 29, 2006

Related U.S. Application Data

(63) Continuation-in-part of application No. 10/709,148, filed on Apr. 16, 2004, now Pat. No. 7,180,029.

(51) Int. Cl.
*H05B 7/11*    (2006.01)
(52) U.S. Cl.
USPC .................. 219/132; 219/136; 219/137 PS
(58) Field of Classification Search
USPC .................................. 219/132, 137, 137 PS
See application file for complete search history.

(56) References Cited

U.S. PATENT DOCUMENTS 2,043,331 A    6/1936    Notvest
2,175,891 A    10/1939    Graham
2,526,597 A    10/1950    Winslow
2,642,515 A    6/1953    Bagg
4,051,344 A    9/1977    Robbins
4,147,919 A    4/1979    Matasovic
4,216,367 A    8/1980    Risberg
4,216,368 A    8/1980    Delay
4,227,066 A    10/1980    Bulwidas, Jr.
4,247,752 A    1/1981    Stringer
4,266,114 A    5/1981    Hansen
4,410,789 A    10/1983    Story
4,467,174 A    8/1984    Gilliland (Continued)

FOREIGN PATENT DOCUMENTS

EP    0575082 A2    12/1993
EP    1586403 A1    10/2005

(Continued)

OTHER PUBLICATIONS

Echelon, "PL 3120/ PL 3150 Power Line Smart Transceiver Data Book," Version 2, 005-0154-01C.

(Continued)

*Primary Examiner* — Henry Yuen
*Assistant Examiner* — Ayub Maye
(74) *Attorney, Agent, or Firm* — Fletcher Yoder P.C.

(57) ABSTRACT

The present invention is directed to a system and method of remotely controlling a welding machine with command signals transmitted to the welding power source across a weld cable connecting the power source to a remote device, such a wire feeder. A transmitter transmits the control commands containing desired welding operational parameters to a receiver disposed in the power source across a weld cable also designed to carry welding power from the power source to the wire feeder.

25 Claims, 6 Drawing Sheets

(56) References Cited

U.S. PATENT DOCUMENTS

| | | |
|---|---|---|
| 4,508,954 A | 4/1985 | Kroll |
| 4,521,672 A | 6/1985 | Fronius |
| 4,584,685 A | 4/1986 | Gajjar |
| 4,641,292 A | 2/1987 | Tunnell et al. |
| 4,767,908 A | 8/1988 | Dallavalle et al. |
| 5,039,835 A | 8/1991 | Schwiete |
| 5,043,557 A | 8/1991 | Tabata et al. |
| 5,276,305 A * | 1/1994 | Hsien ............... 219/132 |
| 5,376,894 A | 12/1994 | Petranovich |
| 5,406,050 A | 4/1995 | Macomber et al. |
| 5,653,902 A | 8/1997 | Chang et al. |
| 6,040,555 A * | 3/2000 | Tiller et al. ............ 219/132 |
| 6,103,994 A | 8/2000 | DeCoster et al. |
| 6,156,999 A | 12/2000 | Ignatchenko et al. |
| 6,423,936 B1 | 7/2002 | Reed |
| 6,570,132 B1 | 5/2003 | Brunner et al. |
| 6,624,388 B1 | 9/2003 | Blankenship et al. |
| 6,781,095 B2 | 8/2004 | Hayes et al. |
| 6,906,285 B2 * | 6/2005 | Zucker et al. ............ 219/132 |
| 6,909,285 B2 | 6/2005 | Jordan et al. |
| 2001/0043656 A1 | 11/2001 | Koslar et al. |
| 2004/0199846 A1 | 10/2004 | Matsumoto et al. |
| 2006/0138113 A1 | 6/2006 | Ott |

FOREIGN PATENT DOCUMENTS

| | | |
|---|---|---|
| JP | 137675 | 6/1986 |
| JP | 162966 | 6/1992 |
| JP | 04162964 | 6/1992 |
| JP | 2003088957 | 3/2003 |
| JP | 2003154455 | 5/2003 |
| JP | 2003191075 | 7/2003 |
| JP | 2003191075 A * | 7/2003 |
| JP | 2003236663 | 8/2003 |

OTHER PUBLICATIONS

Heinrich Hackl et al., "Digitally Controlled GMA Power Sources," pp. 1-7.

Intellon, "CEBus Power Line Encoding and Signaling," White Paper #0027, Mar. 1997, Version 0.1, pp. 1-6.

* cited by examiner

REMOTE WIRE FEEDER USING BINARY PHASE SHIFT KEYING TO MODULATE COMMUNICATIONS OF COMMAND/CONTROL SIGNALS TO BE TRANSMITTED OVER A WELD CABLE

CROSS-REFERENCE TO RELATED APPLICATION

The present application is a continuation-in-part of U.S. Ser. No. 10/709,148 filed Apr. 16, 2004, the disclosure of which is incorporated herein.

BACKGROUND OF THE INVENTION

The present invention relates generally to high power systems utilizing a remote power source and, more particularly, to a method and apparatus of remotely controlling a power source designed to deliver power to a remote device. The invention further relates to a power source whose operation is governed by control signals received across a power cable connecting a remote device to the power source. The invention, while not so limited, is believed to be particularly applicable to welding, plasma cutting, and induction heating systems. One exemplary system to which the present invention is applicable is a Metal Inert Gas (MIG) welding system having a power source and a remote wire feeder.

MIG welding, formerly known as Gas Metal Arc Welding (GMAW), combines the techniques and advantages of Tungsten Inert Gas (TIG) welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either TIG welding, formerly known as Gas Tungsten Arc Welding (GTAW), or Shielded Metal Arc Welding (SMAW) also known as stick welding, thereby making MIG welding a more efficient welding process. Additionally, by continuously feeding the consumable wire to the weld, electrode changing is minimized and as such, weld effects caused by interruptions in the welding process are reduced. The MIG welding process advantageously produces very little or no slag, the arc and weld pool are clearly visible during welding, and post-weld clean-up is typically minimal, relative to other welding techniques. Another advantage of MIG welding is that it can be done in most positions which can be an asset for manufacturing and repair work where vertical or overhead welding may be required.

A wire feeder is operationally connected to the power source and is designed to deliver consumable wire to a weld. To further enhance the operability of the wire feeder of a MIG welding system, known welding systems have connected the power source and the wire feeder to one another across a dedicated control cable that is in addition to a dedicated power or weld cable. Control signals defining the operational parameters of the power source are transmitted or fed back from the wire feeder to the power source. This is generally referred to as remote control to the power source.

One type of remote control device is used to regulate the operational welding parameters, and switch the welding power source output ON and OFF as well as change the power source state via a pendant that connects to the power source by a multi-conductor cable. This solution is schematically illustrated in FIG. 1A. A wire feeder 2A is connected to a remote power source 4A by a control cable 6A that includes a 14-pin connector (not shown). The cable 6A is used to transmit operational information to, and in some cases, from the power source, and may incorporate two to fourteen conductors depending on the number of functions that are to be controlled. Separately connected between the power source 4A and wire feeder 2A is a high-current/high-voltage weld cable 8A that delivers welding power to the wire feeder and creates a voltage potential between an electrode and a workpiece that is exploited to create and maintain an arc between the electrode and workpiece during welding.

A significant drawback to this cable-based control is that the control cable is typically fragile relative to the welding cables designed to carry high currents at high voltages. Welding machines are commonly used at construction sites or shipyards where it is not uncommon for the welding machines to be periodically relocated or surrounded by other mobile heavy equipment operating in the same area. As such, the remote control cable can become damaged by being crushed or snagged from contact with surrounding machines and/or traffic. This can cause damage to the wire feeder and/or the welding power source if internal power conductors become shorted to signal leads that are connected to sensitive signal level circuitry.

Another known system is a voltage following or voltage sensing wire feeder having an internal contactor. This solution is schematically shown in FIG. 1B. As shown, this system includes a wire feeder 2B that receives its electrical power from the voltage present in the welding circuit. The wire feeder is connected to a remote power source 4B via a weld cable 8B. One disadvantage of this system is that the operator has no convenient way to adjust the output of the welding power source to compensate for changes in workpiece thickness and/or fit up. The operator may call another person more conveniently located to the power source with a radio or some other means of communication to make the adjustment; however, if the operator is working alone, s/he must return to the power source to make the necessary adjustments. Another disadvantage of this system is that it requires the presence of a high current DC contactor to de-energize the welding circuit at the wire feeder. These contactors are large, heavy, costly, and require periodic maintenance to ensure proper and continual operation. The location of the secondary contactor in the remotely located wire feeder also requires that the welding circuit from the welding power source to the wire feeder remain energized even when not welding so that power is available to the wire feeder and welding arc when the gun trigger is activated. Accordingly, an open circuit voltage at or near a weld potential remains present across the weld cables. The weld cables, however, can become damaged at a worksite resulting in an unwanted arc being formed between an exposed portion of the cable and an unexpectant ground.

Another remote control solution is described in U.S. Ser. No. 10/604,482, which is assigned to the Assignee of the present application. Notwithstanding the numerous advancements achieved with the invention of the aforementioned pending application, such a system relies upon pulse width modulation to remotely transmit operational data from a wire feeder to a power source across a weld cable. By using pulse width modulated signals to remotely control operation of a power source, the amount of data as well as variability in the types of data that could be transmitted between the wire feeder and a power source is limited. Further, with the system described in the aforementioned pending application, the wire feeder requires an internal DC power supply to power the electronics of the wire feeder. That is, the invention of the above-referenced application teaches the avoidance of an open circuit voltage between the wire feeder and power source. As a result, absent a DC power supply, the wire feeder cannot be minimally powered so as to communicate with the power source to initiate the welding process.

It is therefore desirable to design a welding system incorporating a communications network or link for communication of control command signals from a wire feeder across a weld cable to control or otherwise regulate operation of a remote power source. It would also be desirable to design a remote controlled welding system without needing a dedicated DC power supply disposed in a wire feeder. It would be further desirable to design a wire feeder that receives a low voltage DC input to maintain powering of wire feeder electronics when the wire feeder is in a non-welding, standby state via only the weld cable connections.

BRIEF DESCRIPTION OF THE INVENTION

The present invention is directed to a remotely controlled welding machine that overcomes the aforementioned drawbacks. A remote control uses phase shift keyed (PSK) modulation to transfer control commands to a welding power source across a weld cable. The information to be communicated to the power source may include welding power source output command information (amperage/voltage control), welding circuit on/off information (power source output contactor control), and power source state control (constant voltage/constant current). A transceiver transmits the control commands of desired welding operational parameters to the power source across a weld cable also designed to carry welding power from the power source to the wire feeder.

Therefore, in accordance with one aspect of the invention, a welding-type system has a power source designed to deliver power for a welding-type process. The welding system further has a remote device operably connected to receive power from the power source across a weld cable. A communications link is established between the power source and the remote device across the weld cable and is configured to carry control commands at least between the remote device and the power source. In one preferred aspect, the control commands are encoded using narrow-band phase shift key (PSK) modulation.

In accordance with another aspect, the invention includes a welding system having a power source operable in a power delivery state to deliver power for a welding process and also operable in a stand-by state, wherein the power source is itself powered but does not deliver power for the welding process. The welding system further includes a wire feeder remotely located from the power source and connected to the wire feeder, and designed to receive power for a welding process from the power source across a weld cable. The welding system also has a welding torch that has a trigger and is operably connected to the wire feeder, and designed to deliver consumable wire to a workpiece during the welding process. A communications network is present between the power source and the wire feeder. The communications network is designed to transmit control commands between the power source and the wire feeder across the weld cable. Further, the communications network includes a sensor that detects when the trigger is shifted to a weld start position and upon said detection causes the communications network to transmit a power delivery message to the power source that when received by the power source causes the power source to shift from the stand-by state to the power deliver state such that power for the welding process is delivered from the power source to the wire feeder.

According to another aspect of the invention, the invention is embodied in a method that can be executed as a set of instructions of a computer program or other executable language, such as that executed by a microcontroller or other hardware, firmware, software, and the like. In this regard, a method of remotely controlling a power source for welding is presented. The method includes the step of transmitting a first control message containing operational control information from a wire feeder to a power source remotely located from the wire feeder. The first control message is transmitted across a weld cable connecting the wire feeder and the power source, and the first control message is transmitted at a first frequency. In a further step, the method determines if the power source received the first control message and if not, transmits a second control message. The second control message contains the operational control information of the first control message but is transmitted across the weld cable at a frequency different from the first frequency at which the first control message is transmitted. Like the first control message, the second control message is transmitted between the power source and the wire feeder across the weld cable.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to regulation of a power source and a wire feeder of a MIG welding system based on modulated feedback provided from a transceiver remote from the power source to a receiver incorporated within the power source. However, the present invention is equivalently applicable with regulating power sources of TIG, stick, flux cored, and the like welding systems. Moreover, the present invention is also applicable with non-welding, high power systems such as plasma cutters and induction heaters.

Figure 1A:
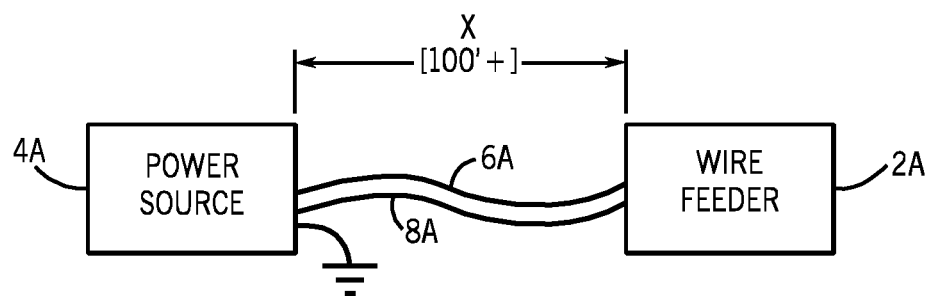
FIGS. 1A-1B are schematic block diagrams illustrating examples of known remotely controlled welding and wire feeder systems.
Figure 1B:
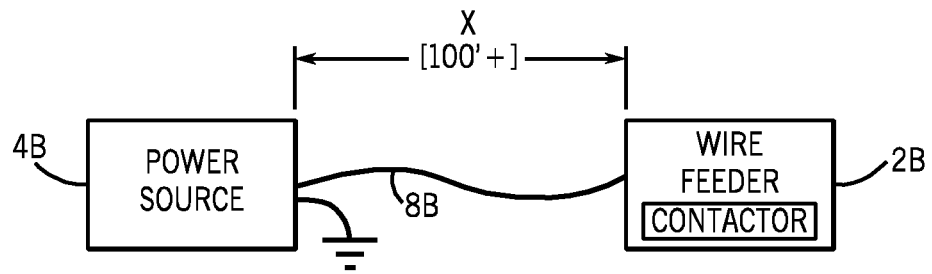
Figure 2:
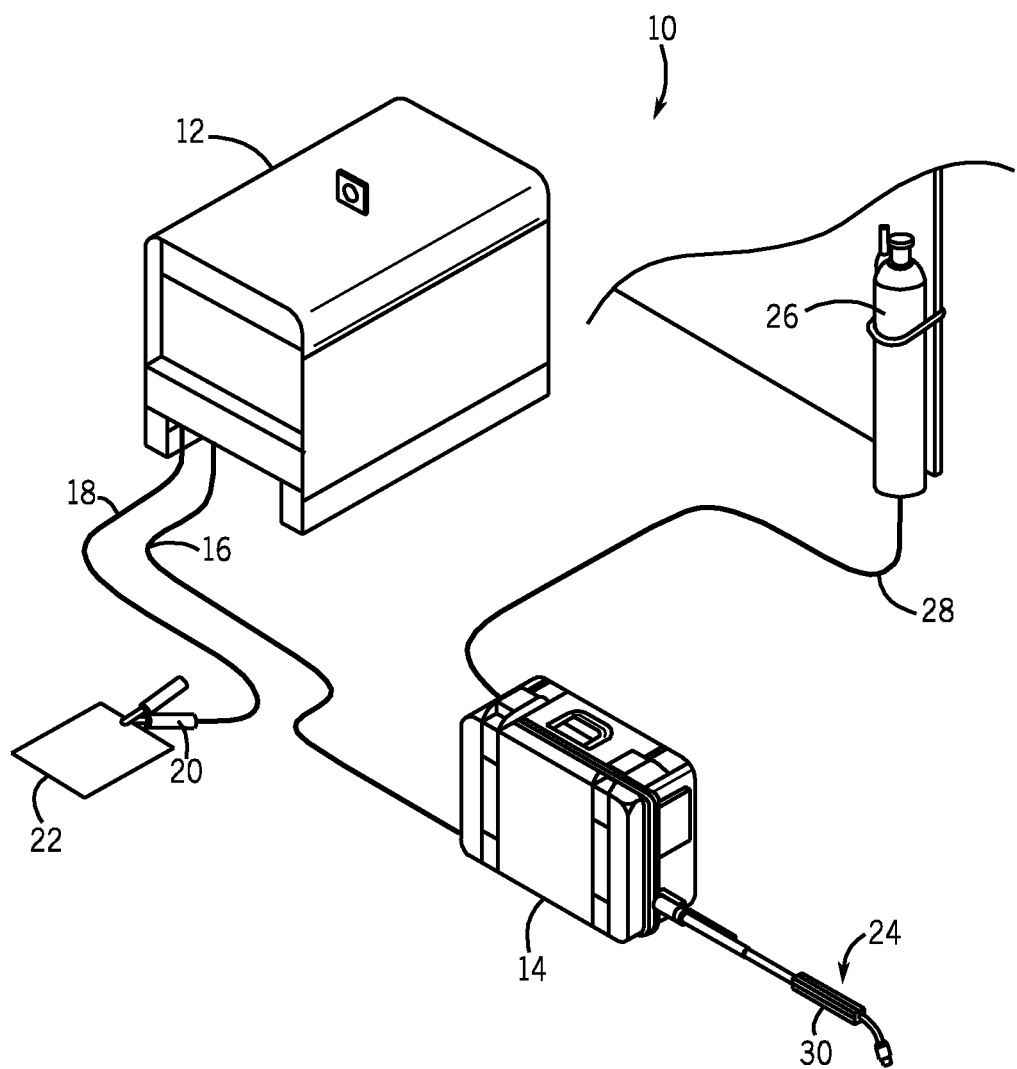
FIG. 2 is a pictorial view of a welding system in accordance with one aspect of the present invention.

Referring to FIG. 2, an exemplary MIG welding system 10 includes a welding power source 12 designed to supply power to a wire feeder 14 through a weld cable 16. The power source is designed to run in one of a number of modes including constant voltage (CV) and constant current (CC). Also connected to the power source is a secondary work weld cable 18 that connects the power source to a clamp 20, which holds cable 18 to workpiece 22. Also connected to wire feeder 14 is a welding gun or torch 24 configured to supply consumable welding wire fed thereto by a feed motor (not shown) to a weld. Welding system 10 may further include a gas cylinder 26 connected to wire feeder 14 such that shielding gas can be provided through gas hose 28 for the MIG welding process.

Power source 12 is designed to condition raw power supplied from a utility line or engine driven power supply and output power usable by the welding process. As such, power source 12 includes one or more transformer assemblies (not shown) to condition the raw power. The output of the power source is generally controlled by a controller and associated operational circuitry that regulates the output of the power conditioning components. As such, the power source may be initially powered but not provide a welding output until the power circuit is energized through the closing of a high current DC contactor or other switching assembly. As will be described in greater detail below, power source 12 is regulated such that a welding power output is not provided until gun 24 is activated signaling commencement of the welding process. In this regard, a welding circuit is not created between power source 12 and workpiece 22 until gun 24 is activated, by depressing gun trigger 30, for example, and is placed in relative proximity with workpiece 22.

As shown, a separate control cord connecting the wire feeder and power source to one another is avoided. Further, wire feeder 14 is preferably constructed without a contactor assembly to close the welding circuit. That is, the power necessary for the wire feeder 14 to supply wire to the weld is not always present across weld cables 16 and 18. Accordingly, a separate contactor or switch assembly is not needed in wire feeder 14 to close the welding circuit. The customary open circuit voltage between a power source and a wire feeder is then eliminated because a communications controller within the wire feeder causes transmission of command signals through weld cables 16 and 18 to a communications controller disposed within the power source that is designed to communicate with a power source controller such that welding power is not provided until the command signal is received from the wire feeder.

Figure 3:
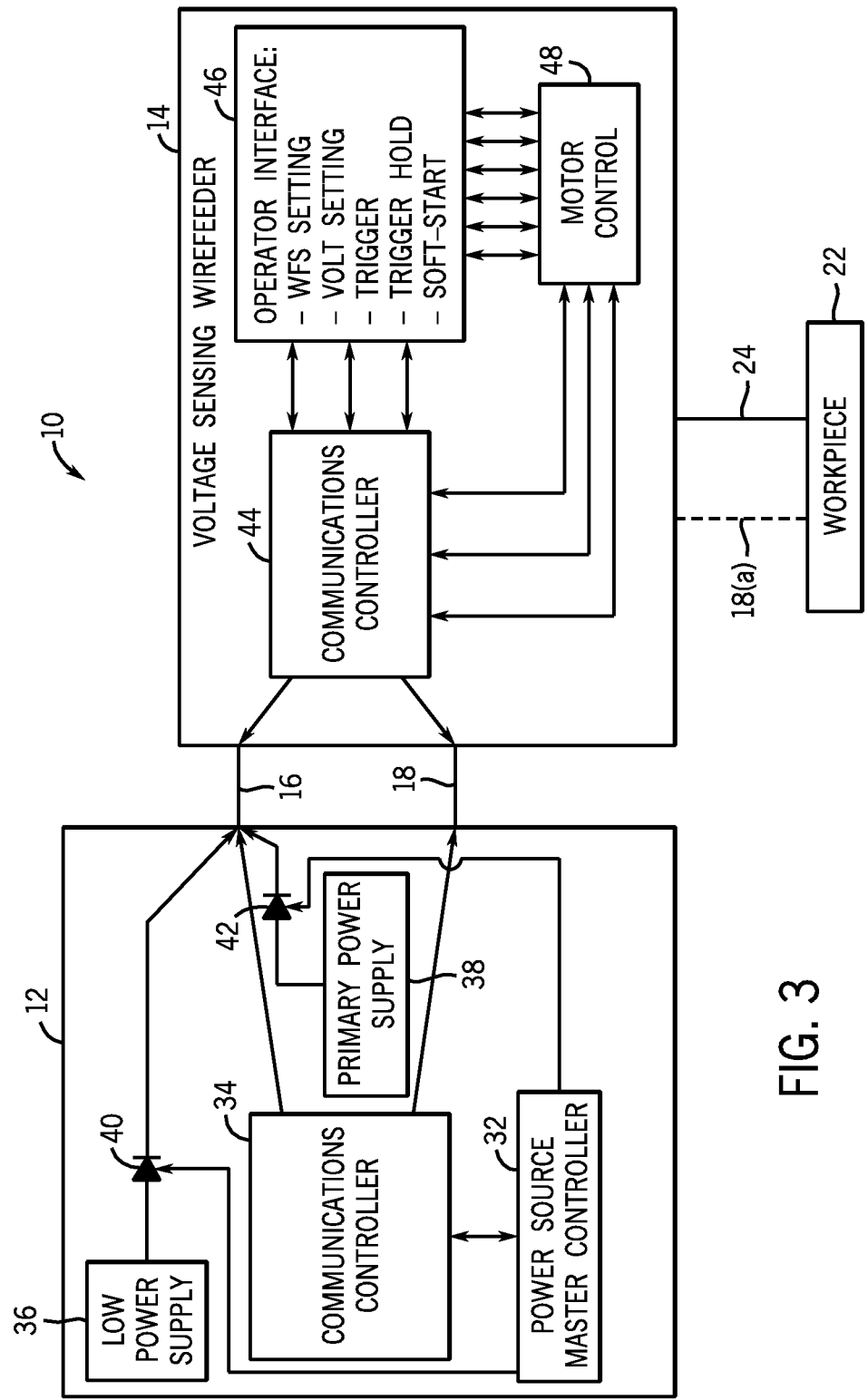
FIG. 3 is a schematic of the welding system illustrated in FIG. 2.

Referring now to FIG. 3, the exemplary welding system of FIG. 2 is schematically shown. Welding system 10 includes power source 12 that is designed to deliver power to voltage sensing wire feeder 14. A welding circuit is formed between the power source and the wire feeder across weld cables 16 and 18 that effectively form a welding circuit. In the schematic illustrated in FIG. 3, weld or ground cable 18 is shown connected to wire feeder 14 and, as a result, the wire feeder would include a weld cable 18(*a*) connected to the workpiece 22. However, one skilled in the art will appreciate that cable 18 may be directly connected to the workpiece and, as such, cable 18(*a*) would be a voltage sensing lead that would also be connected to the workpiece to provide voltage feedback to the wire feeder 14.

Power source 12 includes a master controller 32 designed to regulate operation of the electronic components of the power source. In addition to the master controller 32, the power source is also equipped with a communications controller 34. The communications controller is preferably a LonWorks® PLT-22 Powerline Smart Transceiver, commercially available from Echelon Corporation of San Jose, Calif. LONWORKS is a registered trademark of Echelon Corporation of San Jose, Calif. While it is contemplated that a number of communications controllers may be used, it is preferred that the power source have a LonWorks® PLT22 Powerline Smart Transceiver, that communicates using the LonTalk® communication language. LONTALK is also a registered trademark of Echelon Corporation.

The LonTalk® communication language and the LonWorks® communications controller is a preferred protocol and component, respectively, because the protocol allows the transmission and reception of command signals from other devices in a communications network without needing to know the topology of the network or the names, addresses, or functions of the other devices. The LonWorks® communications controller can also provide signal acknowledgement, signal authentication, and priority delivery.

As will be described more fully below, the power source 12 also includes a low voltage or secondary supply 36 to provide a low, non-welding voltage across the weld cables 16, 18 when the power source is in a non-welding, stand-by state. The power source 12 also has a primary power supply 38, which comprises a transformer (not shown) and other electronics to condition a raw power input into a form usable for a welding process. The low power supply 36 and primary power supply 38 are each controlled by the master controller 32. Each power supply 36, 38 is connected to a switch or diode 40, 42, respectively, that is selectively biased to control the power signal present across the weld cables 16, 18. The primary power supply 38 supplies a welding power at a desired voltage and current to the wire feeder across the weld cables.

The voltage sensing wire feeder 14, like the power source 12, has a communications controller 44. The communications controller is preferably a LonWorks® PLT22 Powerline Smart Transceiver, that communicates with the communications controller of the power source using the LonTalk® protocol. It is contemplated that other communications controllers and communication protocols can be used; however, the communication controllers of the power source and wire feeder should be compatible.

The wire feeder communications controller 44 communicates with the wire feeder's user or operator interface 46 and motor controller 48. The operator interface 46 allows the operator to indicate desired operational parameters including, but not limited to wire feed speed and arc voltage. Generally, a signal indicating the desired wire feed speed is translated to the motor control 48 so that consumable wire is fed to the welding gun or torch at the desired feed rate. A signal indicating the desired arc voltage is fed to the communications controller 44.

The communications controller 44, as will be described below, causes transmission of a message to the power source communication controller 34 across the weld cables. Once received, the power source controller 34 sends a message to the power source master controller 32 of the user-desired arc voltage. The master controller 32 then controls the primary power supply to provide power at the desired voltage across the weld cables.

In addition to receiving a signal when a user provides an operational parameter input, the communications controller 44 is also designed to transmit trigger information to the power source. That is, when the trigger is depressed, the communications controller 44 causes transmission of a welding-commencement signal to the power source communications controller 34. This commencement signal, when received, instructs the power source to provide a welding or primary power. Similarly, when the trigger is released, a welding-termination signal is transmitted across the weld cable and causes the power source to terminate delivery of a welding power and go to a stand-by state. In the stand-by state, it is envisioned that the power source could either provide no power across the weld cables or could provide a non-welding, secondary power that is insufficient for welding, but could be used to power the electronics in the wire feeder.

The above welding system construction has a number of advantages. First, the wire feeder 14 is designed to be a portable or "suitcase" wire feeder such that reduction in weight is clearly advantageous. As such, constructing wire feeder 14 to operate without a separate contactor assembly reduces the overall weight and size of the wire feeder. Furthermore, the contactors required for high current DC applications can be quite expensive thereby increasing the overall cost of the wire feeder. Additionally, the contactor assembly is a maintenance item that may require routine maintenance for continued proper operation. Therefore, constructing wire feeder 14 without such a contactor assembly has a number of size- and cost-associated advantages.

Second, formation of a communications link between power source 12 and wire feeder 14 directly through weld cables 16 and 18 eliminates the need for a separate control/power cable. The control cable adds to the complexity, weight, and overall cost of the welding system. Additionally, as previously noted, the control cord is typically less durable than the welding cables and, as such, is prone to nicks and snags typically associated with industrial locations. Moreover, incorporating the wire feeder without a separate contactor improves the overall current capacity of the wire feeder. That is, the rating of the contactor assembly within the wire feeder generally dictates the ampacity loads of the wire feeder. Removal of the contactor assembly thereby allows the ampacity loads to be governed by other components of the wire feeder which typically have greater maximum ampacity loads than the contactor assembly.

Figure 4:
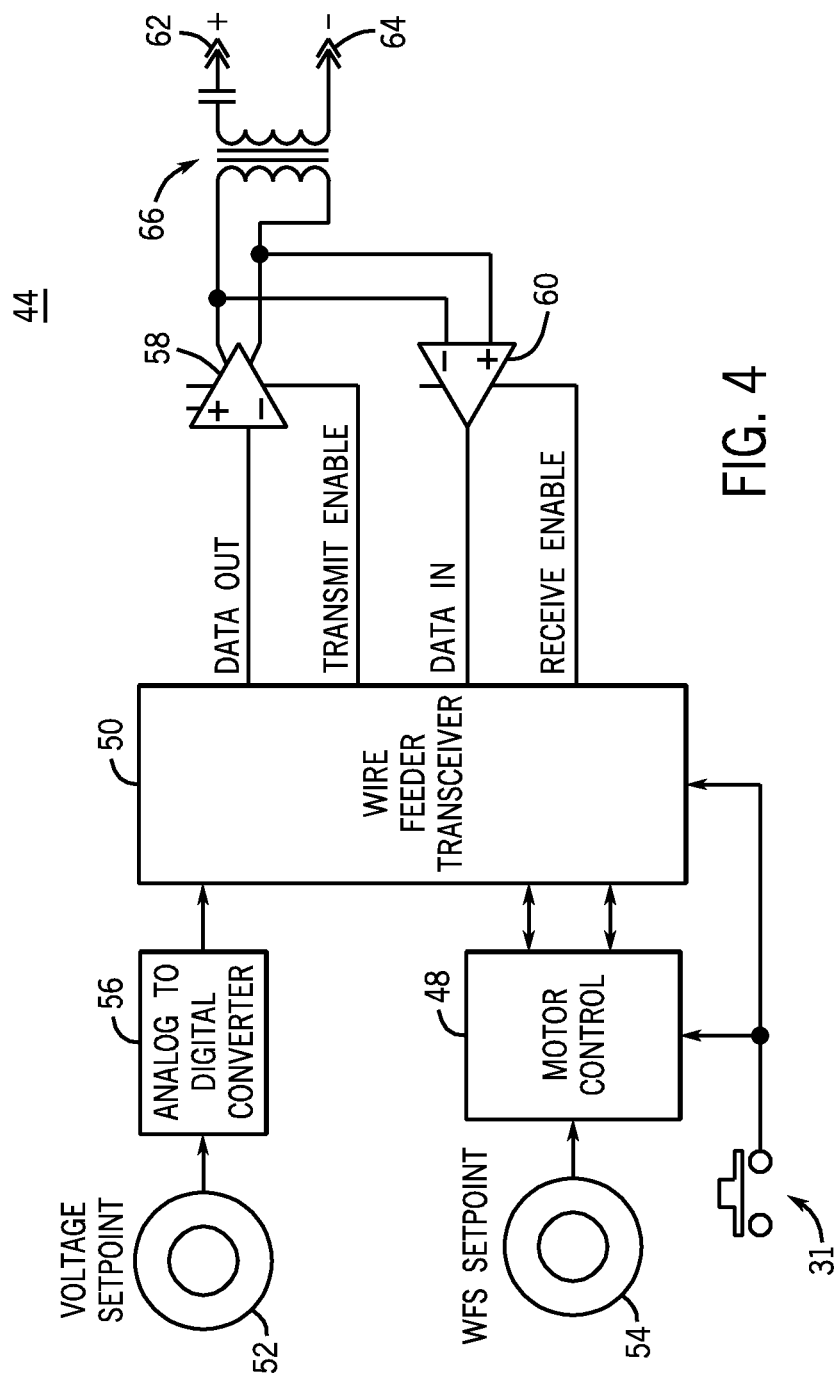
FIG. 4 is a schematic of the wire feeder communications circuit illustrated in FIG. 2.

Referring now to FIG. 4, a block diagram illustrates an exemplary configuration of the wire feeder communications controller and its associated inputs/outputs. As illustrated, the controller includes a power-line transceiver 50 that is designed to transmit and receive operational data. The transceiver receives operational set-point data from the operator interface, such an arc voltage control knob 52 and a wire feed speed control knob 54. It is understood that additional or different operational input devices may be used and connected to the power-line transceiver 50. Additionally, it is contemplated that the user interface (or portions thereof) may be integrated with the gun or torch to allow user control of the welding process without leaving the weld.

Connected between the arc voltage set-point knob 52 and the transceiver 50 is an analog-to-digital converter 56 that converts the analog output of control knob 52 to a digital input for the transceiver.

An input to the wire feed speed control knob is communicated to the wire feed speed motor controller 48 and then communicated to the transceiver 50. It is contemplated that communication between the motor controller 48 and the transceiver is bi-directional. Additionally, the motor controller 48 and the transceiver 50 are operably connected to detect activation of trigger of the welding gun or torch. It is contemplated that a number of sensor devices and techniques may be used to detect activation of the trigger, e.g., an infrared sensor (not shown) in proximity to the trigger or a contact switch 31.

Transceiver 50 transmits operational parameter data in the form of a command signal to the power source that embodies the user-desired inputs to control knobs 52, 54 as well as trigger status. The command signal is preferably encapsulated in a defined protocol, such as the LonTalk® protocol, and encoded with a narrow-band binary phase shift keying (BPSK) modulation scheme, but it is contemplated that other modulating protocols may be used, such as, quadrature phase shift keying (QPSK). In a further preferred embodiment, narrow-band binary PSK is used to modulate the command signal for transmission to the power source across the weld cable.

Controller 44 also includes a pair of amplifiers 58, 60 connected to the transceiver 50. Amplifier 58 facilitates the transmission of data out of the transceiver when properly enabled and amplifier 60 facilitates the reception of data for subsequent inputting to the transceiver when properly enabled. Both amplifiers are connected to the weld cables 16, 18 via corresponding weld terminals 62, 64 by coupling transformer 66. The coupling transformer 66 provides galvanic isolation to the weld voltage potential and provides a voltage level translation for translating the control command signal to a level compatible with the weld cables. It is also recognized that the coupling transformer advantageously provides impedance matching.

Figure 5:
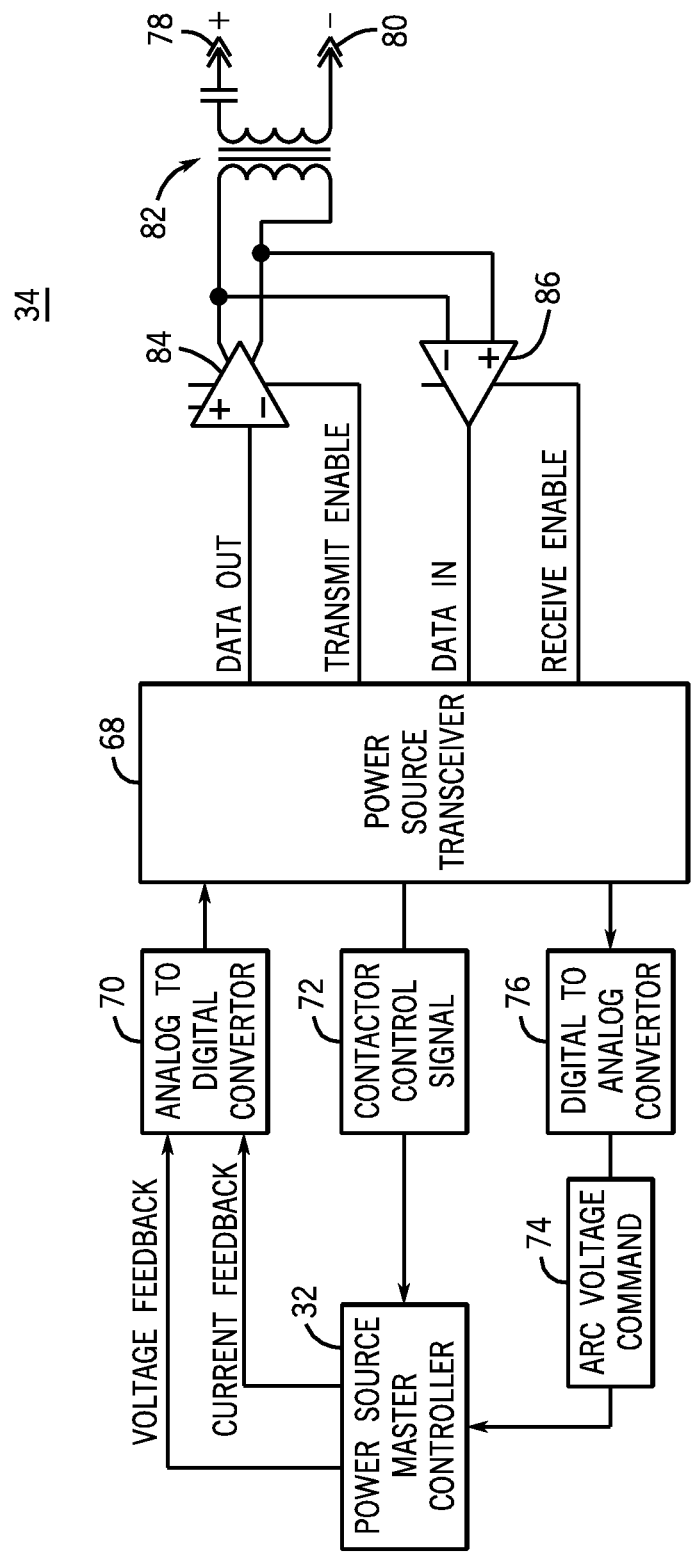
FIG. 5 is a schematic diagram of the power source communications circuit illustrated in FIG. 3.

Referring now to FIG. 5, a block diagram illustrates an exemplary configuration of the power source communications controller and its associated inputs/outputs. The power source communications controller, the welding circuit, and the wire feeder communications controller effectively form a communications link. Like the wire feeder controller, the power source controller 34 has a power-line transceiver 68 to facilitate communication between the power source and the wire feeder. Transceiver 68 is connected to receive voltage and current feedback from the power source master controller through analog-to-digital converter 70. In this regard, the master controller, which controls operation of the power delivery components of the wire feeder, provides feedback as the voltage and current levels the power components are being driven to the transceiver, which can be subsequently transmitted to the wire feeder. Accordingly, the master controller (not shown) of the wire feeder, which includes voltage and/or current sensors (not shown) may compare the commanded voltage and/or current levels to sensed voltage and/or current levels to determine if the system is operating properly and, if not, provide an alert to the user.

As referenced above, in addition to operational parameter data, it is envisioned that the wire feeder also provide a trigger status signal to the power source. As such, transceiver also provides a contactor control message output 72 to the master controller 32. The contactor control message allows the master controller to selectively open/close the primary contactor (generally shown as diode 42 in FIG. 3) in the power source. The primary contactor is used to control the application of welding power between the power source and the wire feeder. Accordingly, when the power or primary contactor is open, welding power cannot be delivered to the wire feeder from the power source. When closed, welding power can be delivered.

It is contemplated, however, that the power source may include a primary as well as a secondary contactor (generally shown as diode 40 in FIG. 3). The secondary contactor, when closed, closes a secondary power circuit between the power source and the wire feeder across the weld cables. This secondary power circuit can be used to supply a non-welding power between the power source and the wire feeder. The primary contactor is generally large and costly, therefore, it is envisioned that the secondary contactor could be much smaller than the primary contactor. By utilizing a secondary contactor in addition to the primary contactor, the power source can supply sufficient power to the wire feeder for the wire feeder electronics without the need for a large open circuit voltage between the power source and wire feeder, or a battery in the wire feeder to power the wire feeder electronics.

In addition to providing a contactor control message 72 to the master controller 32, it is contemplated that the transceiver communicate an arc voltage command signal 74 to the master controller 32 through digital-to-analog converter 76.

Similar to the transceiver of the wire feeder, transceiver 68 is also connected to weld terminals 78, 80 via coupling transformer 82 and amplifiers 84, 86. Coupling transformer provides similar functionality as the coupling transformer 66 in the wire feeder 14. Amplifier 84, when enabled, supports the transmission of data from the power source to the wire feeder across the weld cables. Amplifier 86, when enabled, facilitates the reception of data from the wire feeder across the weld cables.

In a preferred embodiment, the control command messages are encapsulated in the LonTalk® protocol and enclosed with a BPSK modulation scheme and transmitted over the weld circuit using dual carriers to provide a robust communications link between the power source and the wire feeder. That is, communication between the power source and the wire feeder is through narrow-band binary PSK digital modulation in the CENELEC A and CENELEC C bands of operation. As described with respect to FIG. 6, the communications between the power source and the wire feeder include a verification/acknowledgement feature to add to the robustness of the communications link.

Figure 6:
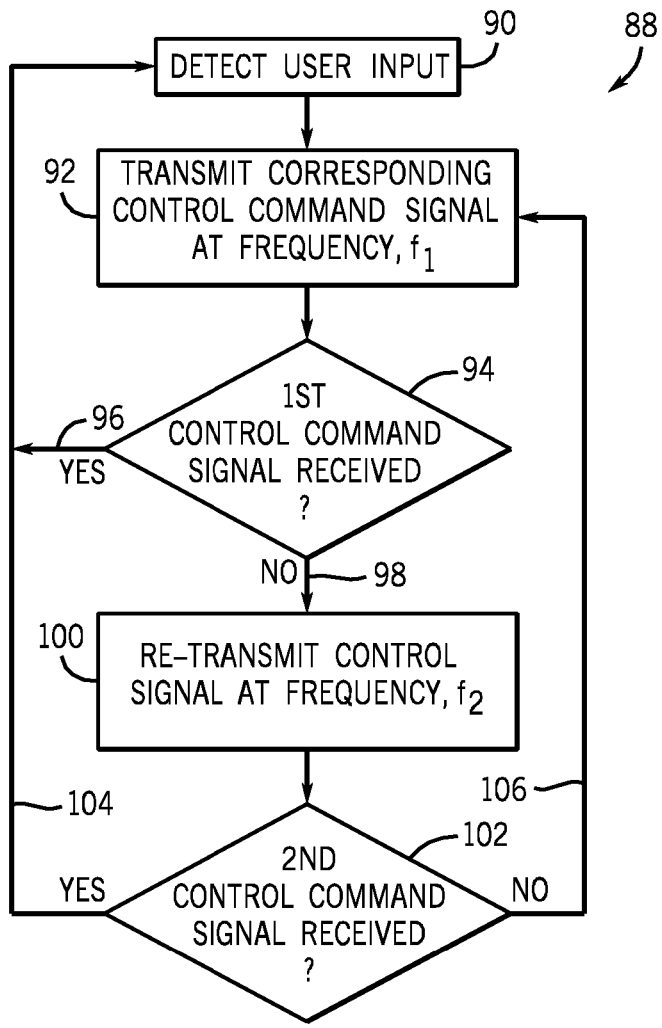
FIG. 6 is a flow chart setting forth the steps of remotely controlling a power source according to another aspect of the present invention.

Referring now to FIG. 6, a flow chart setting forth the steps of remotely controlling a power source according to another aspect of the present invention is shown. The process 88 begins at 90 with detection of a user input to one of number of operator parameter input devices, such as control knobs 52 and 54 or trigger switch 30. Software of the transceiver in the wire feeder associates this user input with a network variable. As a result, a change to the parameter input device results in a change to the network variable. Using the desired protocol, such as the LonTalk® protocol, this new network variable in the form of a control command signal containing corresponding operation control data is transmitted 92 to the power source across the welding circuit. As described above, the protocol layers including the network variable data, i.e., the operation control data, is encoded with a BPSK modulation scheme for transmission over the weld cables. The transceiver of the wire feeder then awaits an acknowledgement signal from the transceiver of the power source to confirm that the control command signal transmitted at 92 was properly received. As such, process proceeds to decision block 94.

If the control command signal was received and an acknowledgement was received by the wire feeder 94, 96, the process loops back to step 90 and waits for the next user input. However, if the transmitted control command signal was not properly received, e.g., the power source transceiver transmits an error signal, or if no acknowledgement signal is received by the wire feeder transceiver 94, 98, the control command signal is re-transmitted at 100. While the re-transmission may be at the same frequency as the original transmission, it is preferred that the re-transmission be at a different frequency than the original transmission. For example, in one preferred embodiment, the original transmission is at or near 128 kHz and the re-transmission is at or near 141 kHz.

Following re-transmission of the control command signal 100, the process proceeds to step 102 and determines if the re-transmission was received and acknowledged at 102 in a manner similar to the verification carried out at step 94. If the re-transmission was received and verified 102, 104, the process returns to step 90 and awaits a user input to one of the number of parameter input devices. However, if the re-transmission was either not received or not verified 102, 106, the process, in one preferred embodiment, returns to step 92 with the re-transmission of the control command signal at the original frequency. Thereafter, the process re-loops until the control command signal is received and verified.

It is contemplated that rather than re-transmit the control command signal at the original frequency, re-transmission could be at another, third (fourth, fifth, sixth, etc.) frequency. In this regard, the command signal is re-transmitted and cycled through multiple frequencies until it is received and verified. Moreover, it is contemplated, whether two or more transmission frequencies are used, that a fixed number of transmissions be attempted before the communications controller provides an error message to the user. It is contemplated that the error could take the form of an audio and/or visual signal as well as cause the wire feeder to go to or remain in a stand-by state.

The present invention supports bi-directional acknowledged communication between the wire feeder and the power source. In this regard, the power source transmits data to the wire feeder and the wire feeder transmits data to the power source. This data may be operational data or signal acknowledgement data. In any event, it is preferred that the flow chart steps described with respect to FIG. 6 be carried out by each communications controllers when that controller is transmitting operational control commands. Thus, the power source communications controller performs process 88 when communicating operational control data to the wire feeder and the wire feeder communications controller performs process 88 when communicating operational control data to the power source.

While bi-directional communication is preferred, it is contemplated that the wire feeder may be equipped with a transmitter and the power source with a receiver to support uni-directional communication between the two components.

As described above, the control command signal includes information regarding desired operational parameters of the wire feeder and instructs the master controller of the power source to set the magnitude of the output of the welding power source (volts or amperes), the mode of the welding power source (CC or CV), and wire feed speed among other parameters. The wire feeder transceiver is also configured to transmit commands regarding JOG and PURGE functions. That is, when the JOG button is pushed on the wire feeder, the transceiver automatically repeats the minimum reference command each time the open circuit voltage of the welding power source falls to zero.

While the communications controllers for the power source and wire feeder have been described as being internal to the power source and wire feeder, it is contemplated that one or both controllers could be housed in modules external to the power source and wire feeder. In this regard, the communications network can take the form of a kit that can be used to retrofit existing welding systems. It is also contemplated that new systems could also be constructed with the communications modules secured to an external surface of the power source and/or wire feeder.

User interface 46 is designed to receive analog and/or discrete inputs from an operator that collectively define operation of a welding process. As wire feeder 14 supports digitized control of the welding process, the operator is able to input with a certain degree of specificity exact operating parameters via user panel 46. However, as welding system 10 is a remotely controlled system, the communications controller of the wire feeder 14 receives the user inputs whereupon those inputs are fed to the wire feeder transceiver for transmission to the power source communications controller across the weld cables.

Referring again to FIG. 3, as referenced above, welding power source 12 may include a low voltage DC power supply 36 that is used as a secondary source of power that may be delivered across weld cable 16 when the wire feeder 14 is in an ON, but non-welding state, i.e. standby. In this regard, the electronics to the wire feeder 14 are sufficiently powered thereby avoiding a "rebooting" of the wire feeder 14 between welding projects. One skilled in the art will appreciate, however, that after a specified time has elapsed since welding, the wire feeder 14 may be placed in shutdown. Although not preferred, a battery (not shown) may be disposed in the wire feeder to power the electronics of the wire feeder when a power is not being delivered by the power source. Accordingly, it is contemplated that the power source not provide any power to the wire feeder until commanded to do so by control commands received from the wire feeder. It is recognized that the battery may be a rechargeable battery and may be connected to the welding circuit such that recharging takes place during an active welding session.

As mentioned above, low voltage power supply 36, which may be incorporated within power source 12 or the external to the power source, is designed to provide a relatively low voltage power supply to the wire feeder during standby operation of the wire feeder. In a preferred embodiment, the low voltage supply is provided across the weld cable. As such, when the low voltage power supply 36 is integrally disposed within the power source 12, the power source will include a primary contactor, generally referenced as diode 42, as well as secondary contactor, generally referenced as diode 40, to control the flow of power between itself and the wire feeder. That is, a primary contactor 42 is electrically connected to primary power supply 38, i.e. a transformer which is designed to condition an input power from a utility or engine driven power supply into a form usable by a welding-type process, that will be used to control application of a welding (or relatively high) voltage between the wire feeder and the power source. In this regard, the primary contactor 42 is not closed so as to form a welding circuit between the wire feeder and the power source until specifically instructed to do so by operator commands received across weld cable 16 from the remote wire feeder 14.

On the other hand, the secondary contactor 40 which is electrically isolated from primary contactor 42 and is electrically connected to low voltage power supply 36, is used to control application of a low voltage power supply 36. That is, if the power source 12 is operating and connected to wire feeder 14 or some other remote device, a low voltage will be present across cable 16 to power electronics of the wire feeder or other remote device. During the welding process, however, the primary voltage, or a weld voltage, will be used or otherwise "tapped" into by the wire feeder to control its electronics. It is envisioned that the power source and the wire feeder each have at least three states—an OFF state, a welding (ON) state, and a standby state. Standby may be defined as a non-welding, ON state wherein the wire feeder and its electronics are energized but an active welding process is not taking place. It is desirable to put the wire feeder in standby during intervals between welding.

The voltage sensing receiver section of the remote control is configured to detect both start and reference commands. Therefore, a remote user can remotely switch ON the welding power output of the power source and set the magnitude of the power source output. The wire feeder also includes a current sensing circuit (not shown) that detects arc current and maintains the power source in an ON state while welding. The welding power output effectively supersedes the standby power output provided to power the wire feeder when in a standby state. That is, it is contemplated that the primary and the secondary contactor in the power source can be in a conductive state when welding but only the secondary contactor is conductive when the wire feeder is in standby. Also, the wire feeder preferably includes circuitry to effectively "tap" into the weld voltage for powering of its electronics during welding.

As described above, in a preferred embodiment, the wire feeder is constructed without a contactor that is typically used to close the welding circuit, i.e., allow delivery of welding power to the electrode. While preferred, the present invention is not so limited. That is, it is contemplated that the wire feeder could be constructed to have a contactor to close the welding circuit. In this regard, the power source is commanded, when ON, to provide a weld voltage to the wire feeder, but that weld voltage is not delivered to the electrode until the controller in the wire feeder causes closure of the contactor. In this regard, remote voltage control is provided without requiring remote state shifting of the power source from a stand-by state to the weld power delivery state. One advantage of such a construction is that the wire feeder electronics can be powered in a conventional manner directly from the open circuit voltage present across the weld cables. For those embodiments where it is desirable to avoid a dedicated wire feeder contactor, it is contemplated that either a non-welding voltage may be provided by the power source to the wire feeder to power the wire feeder electronics or, alternatively, the wire feeder may be equipped with a battery to provide operational power to the wire feeder electronics when a non-welding power is being delivered to the wire feeder by the power source.

Further, as described above, it is contemplated that the power source be remotely switched from a stand-by state to a weld state. In the stand-by state, the power source provides a low voltage, low current power to the wire feeder to sufficiently power the electronics of the wire feeder. In the weld state, the power source provides a high voltage, high current output to the wire feeder. However, in a further embodiment, it is contemplated that the power source may be remotely commanded to operate in an intermediate state. In this intermediate state, the power source provides a low voltage, medium current power to the wire feeder. In this state, the power source, like in the stand-by state, still provides a non-welding power, but provides additional power for those non-welding tasks that require more current draw than that provided by the power source when in the stand-by state. For example, the power source may be commanded to the intermediate state when the operator presses the JOG button on the wire feeder. In this regard, the wire feeder requests JOG power from the power source that when supplied by the power source energizes the drive motor of the wire feeder to job the weld wire. It is recognized that jogging of the weld wire is an exemplary non-welding task and that other non-welding tasks are contemplated.

As stated above, the present invention is also applicable with non-MIG welding systems such as TIG and stick welders. Further, the aforedescribed circuitry may be implemented to automatically adjust the output of a power source to compensate for losses that occur across weld cables. That is, in some manufacturing and/or industrial settings, the weld is a relatively great distance from the power source. As such, the weld cables may be dozens to over a hundred feet in length. This weld cable length results in losses from the output terminal of the power source to the weld. Simply, the voltage at the output terminals of the power source (where the weld cable is connected to the power source) may be significantly more than the voltage across the weld. Accordingly, the present invention may be used to transmit a voltage feedback signal at the weld to the power source whereupon the master or other controller in the power source compares the voltage at the terminal to the voltage at the weld and adjusts the voltage at the terminal such that after the losses experienced across the weld cables, the voltage at the weld is at the level requested by the user.

Therefore, a welding-type system has a power source designed to deliver power for a welding-type process is disclosed. The welding system further has a remote device operably connected to receive power from the power source across a weld cable. A communications link is established between the power source and the remote device across the weld cable and is configured to carry control commands at least between the remote device and the power source. In one preferred aspect, the control commands are encoded using narrow-band phase shift key (PSK) modulation.

The invention also includes a welding system having a power source operable in a power delivery state to deliver power for a welding process and also operable in a stand-by state, wherein the power source is itself powered but does not deliver power for the welding process. The welding system further includes a wire feeder remotely located from the power source and connected to the wire feeder, and designed to receive power for a welding process from the power source across a weld cable. The welding system also has a welding torch that has a trigger and is operably connected to the wire feeder, and designed to deliver consumable wire to a workpiece during the welding process. A communications network is present between the power source and the wire feeder. The communications network is designed to transmit control commands between the power source and the wire feeder across the weld cable. Further, the communications network includes a sensor that detects when the trigger is shifted to a weld start position and upon said detection causes the communications network to transmit a power delivery signal to the power source that when received by the power source causes the power source to shift from the stand-by state to the power deliver state such that power for the welding process is delivered from the power source to the wire feeder.

The invention may also be embodied in a method that can be executed as a set of instructions of a computer program or other executable language, such as that executed by a microcontroller or other hardware, firmware, software, and the like. In this regard, a method of remotely controlling a power source for welding is presented. The method includes the step of transmitting a first control message containing operational control information from a wire feeder to a power source remotely located from the wire feeder. The first control message is transmitted across a weld cable connecting the wire feeder and the power source, and the first control message is transmitted at a first frequency. In a further step, the method determines if the power source received the first control message and if not, transmits a second control message. The second control message contains the operational control information of the first control message but is transmitted across the weld cable at a frequency different from the first frequency at which the first control message is transmitted. Like the first control message, the second control message is transmitted between the power source and the wire feeder across the weld cable.

The present invention has been described in terms of the preferred embodiment, and it is recognized that equivalents, alternatives, and modifications, aside from those expressly stated, are possible and within the scope of the appending claims.

What is claimed is:

1. A welding-type system comprising:
   a power source designed to deliver power for a welding-type process;
   a remote device operably connected to receive power from the power source across a weld cable; and
   a communications link configured to carry control commands at least between the remote device and the power source, and established between the power source and the remote device across the weld cable, wherein the control commands are encoded using narrow-band binary phase shift key modulation.

2. The welding-type system of claim 1 wherein the PSK modulation includes narrow-band binary PSK.

3. The welding-type system of claim 1 wherein the communications link is further configured to transmit a given command signal across the weld cable at a first frequency and if the given command signal is not adequately received then transmit the given command signal across the weld cable at a second frequency different from the first frequency.

4. The welding-type system of claim 3 wherein the first frequency is approximately 128 kHz and the second frequency is approximately 141 kHz.

5. The welding-type system of claim 1 wherein the communications link is further configured to only carry control commands across the weld cable when the remote device is at idle.

6. The welding-type system of claim 1 wherein the communications link is further configured to carry control commands across the weld cable during an active welding-type process.

7. The welding-type system of claim 1 wherein the remote device is a wire feeder.

8. The welding system of claim 7 wherein the wire feeder is a voltage-sensed wire feeder.

9. The welding-type system of claim 1 wherein the communications link includes a sensor designed to sense depressing and releasing of a trigger of a welding-type gun and when the trigger is depressed carry a power delivery initiation signal from the remote device to the power source across the weld cable and when the trigger is released carry a power delivery termination signal from the remote device to the power source across the weld cable.

10. The welding-type system of claim 1 wherein the control commands include desired operating parameters for the power source for the welding-type process.

11. The welding-type system of claim 10 wherein the desired operation parameters include a desired arc voltage.

12. A welding system comprising:
   a power source operable in a power delivery state wherein power for a welding process is delivered and operable in a stand-by state wherein the power source is itself powered but does not deliver power for the welding process;
   a wire feeder remotely located from the power source and connected to the wire feeder and designed to receive power for a welding process from the power source across a weld cable;
   a welding torch having a trigger and operably connected to the wire feeder and designed to deliver consumable wire to a workpiece during the welding process;
   a communications network between the power source and the wire feeder, the communications network designed to transmit control commands between the power source and the wire feeder across the weld cable; and
   wherein the communications network includes a sensor that detects when the trigger is shifted to a weld start position and upon said detection causes the communications network to transmit a power delivery signal to the power source that when received by the power source causes the power source to shift from the stand-by state to the power deliver state such that power for the welding process is delivered from the power source to the wire feeder.

13. The welding system of claim 12 wherein the power source is further configured to provide a non-welding power to the wire feeder when in the stand-by state and electronics of the wire feeder are powered by the non-welding power when the power source is in the stand-by state.

14. The welding system of claim 12 wherein the communications network includes a wire feeder transceiver and a power source transceiver.

15. The welding system of claim 14 wherein each transceiver is configured to transmit operational control commands over the weld cable.

16. The welding system of claim 15 wherein the operational control commands are transmitted using binary PSK modulation.

17. The welding system of claim 15 wherein the communications network is designed such that a given command signal is first transmitted at a first frequency and if the given command signal is not properly received the given command signal is then transmitted at a second frequency different from the first frequency.

18. The welding system of claim 17 wherein the first frequency is approximately 128 kHz and the second frequency is approximately 141 kHz.

19. A method of remotely controlling a power source for welding comprising the steps of:
   transmitting a first control message containing operational control information from a wire feeder to a power source remotely located from the wire feeder, the first control message transmitted across a weld cable connecting the wire feeder and the power source, and the first control message transmitted at a first frequency;
   determining if the power source received the first control message; and if not,
   transmitting a second control message different from the first control message but containing the operational control information of the first control message from the wire feeder to the power source, the second control message transmitted across the weld cable and at a second frequency different than the first frequency.

20. The method of claim 19 further comprising the step of transmitting the first control message at approximately 128 kHz and transmitting the second control message at approximately 141 kHz.

21. The method of claim 19 further comprising the step of modulating the first control message and the second control message using PSK digital modulation.

22. The method of claim 18 further comprising the step of powering electronics of the wire feeder when in a stand-by state with a non-welding power provided by the power source to the wire feeder across the weld cable.

23. The method of claim 18 wherein the steps of transmitting occur during an active welding operation.

24. The method of claim 18 wherein transmission from the wire feeder to the power source occurs when the wire feeder is at idle.

25. The method of claim 18 further comprising the step of automatically transmitting the first control message upon user adjustment of a parameter input device.

* * * * *